US006996137B2

(12) United States Patent
Byren et al.

(10) Patent No.: US 6,996,137 B2
(45) Date of Patent: Feb. 7, 2006

(54) SOLID-STATE DEVICES WITH RADIAL DOPANT VALENCE PROFILE

(75) Inventors: Robert W. Byren, Manhattan Beach, CA (US); David S. Sumida, Los Angeles, CA (US)

(73) Assignee: Raytheon Company, Waltham, MA (US)

(*) Notice: Subject to any disclaimer, the term of this patent is extended or adjusted under 35 U.S.C. 154(b) by 292 days.

(21) Appl. No.: 10/119,462

(22) Filed: Aug. 6, 2002

(65) Prior Publication Data

US 2004/0028101 A1 Feb. 12, 2004

(51) Int. Cl.
*H01S 3/11* (2006.01)
*H01S 3/16* (2006.01)

(52) U.S. Cl. .......................................... 372/10; 372/41

(58) Field of Classification Search ............ 372/10–11, 372/39–41; 257/101–103
See application file for complete search history.

(56) References Cited

U.S. PATENT DOCUMENTS 4,572,618 A * 2/1986 Abraham et al. ........... 359/241
4,824,598 A 4/1989 Stokowski
4,833,333 A * 5/1989 Rand ....................... 250/492.3
4,836,953 A * 6/1989 Kokta .................. 252/301.4 F
4,969,154 A * 11/1990 Esterowitz et al. ........... 372/68
4,987,575 A * 1/1991 Alfano et al. ................. 372/41
4,988,402 A * 1/1991 Kokta ................. 252/301.4 R
5,107,509 A * 4/1992 Esterowitz et al. ........... 372/20
5,119,382 A * 6/1992 Kennedy et al. .............. 372/11
5,360,557 A * 11/1994 Tsoukala et al. ........ 250/361 R
5,581,573 A * 12/1996 Tanuma ....................... 372/72
5,699,175 A * 12/1997 Wilde ........................... 359/7
5,761,233 A * 6/1998 Bruesselbach et al. ........ 372/72
5,847,851 A * 12/1998 Wechsler et al. .............. 359/7
5,851,297 A * 12/1998 Kumagai et al. ........... 118/722
5,864,412 A * 1/1999 Wilde ........................... 359/7

(Continued)

FOREIGN PATENT DOCUMENTS

FR 2339266 6/1977

OTHER PUBLICATIONS

W. Gellermann et al, J. Appl. Phys. 61, 1297-1303 (1987).

(Continued)

*Primary Examiner*—Minsun O. Harvey
*Assistant Examiner*—Phillip Nguyen
(74) *Attorney, Agent, or Firm*—John E. Gunther; Leonard A. Alkov; Karl A. Vick

(57) ABSTRACT

A solid state, laser light control device (20, 30) and material (10), and methods of producing same. The device (20, 30) and material (10) consist essentially of a host material (14) which contains: a dopant species (16) at a first valence state (a), the concentration of which increases with distance from the surface (18); and the same dopant species (16) at a second valence state (b), the concentration which decreases with distance from the surface (18). The method comprises the steps of: obtaining a doped solid state material (14); exposing the solid state material (14) to elevated temperature, for a period of time, in an oxidizing or reducing atmosphere. The elevated temperature and time of exposure are selected to change the valence state (a) of the dopant (16) in direct proportion to distance from the surface (18) of the solid state material (16). What is thereby produced is a solid state device (20, 30) in which the concentration of the dopant 16 at the second valence state (b) decreases with radius, the concentration of the dopant (16) at the first valence state (a) increases with radius, and the sum of these concentrations remains constant.

42 Claims, 6 Drawing Sheets

U.S. PATENT DOCUMENTS

| | | | | |
|---|---|---|---|---|
| 6,468,699 | B2 * | 10/2002 | Lahrichi | 430/1 |
| 6,472,242 | B2 * | 10/2002 | Peterson et al. | 438/27 |
| 6,514,435 | B1 * | 2/2003 | Hasan et al. | 252/584 |
| 6,566,152 | B2 * | 5/2003 | Peterson et al. | 438/27 |
| 6,839,362 | B2 * | 1/2005 | Kokta et al. | 372/10 |

OTHER PUBLICATIONS

W. Koechner, Solid-State Laser Engineering, 3rd edition, Springer Verlag (1992), ch. 6.

Koechner, W., Solid State Laser Engineering, 2nd Ed., Springer-Verlag, Berlin, pp 437-442 (1988).

Ghandhi, S. K. The Theory and Practice of Microelectronics, John Wiley & Sons, Inc, New York, pp. 59-85, 1968.

B. Wechsler & D. Sumida, "Laser Crystals", in CRC Handbook of Laser Science and Technology, Supplement 2: Optical Materials, M.J. Weber, ed, CRC Press, Boca Raton, p. 595-616 (1995).

L. DeShazer, S. Rand, and B. Wechsler, "Laser Crystals," in CRC Handbook of Laser Science and Technology, vol. V, M.J. Weber, ed, CRC Press, Boca Raton, p. 281-338 (1987).

Laser.Glasses: Bulk Glasses, CRC Handbook of Laser Science and Technology, Supplement 2: Optical Materials, M.J. Weber, ed, CRC Press, Boca Raton, p. 619-634 (1995).

S. T. Davey, B. J. Ainslie, and R. Wyatt, "Laser.Glasses: Waveguide Glasses", CRC Handbook o Laser Science and Technology, Supplement 2: Optical Materials, M.J. Weber, ed, CRC Press, Boca Raton, p. 635-668 (1995).

J. Lu et al, Appl. Phys. B, 71, 469 (2000), J. Lu et al, Jpn J. Appl. Phys, 39, 1048 (2000).

I. Shoji et al, Appl. Phys. Letts, 77, 939 (2000).

R. D. Shannon, "Revised Effective Ionic Radii and Systematic Studies of Interatomic Distances in Halides and Chalcogenides," Acta Cryst. A32, pp. 751-767 (1976).

Nogami, M et al: #SM2+-Doped Silicate Glasses Prepared By A Sol-Gel Process, Applied Physics Letters, American Institute of Physics, New York, US, vol. 65, No. 10, Sep. 5, 1994, pp. 1227-1229, XP000464611, ISSN: 0003-6951, p. 1228, Col. 1, line 3-line 15.

Morinaga, K. et al: "Compositional Dependence of the Valency State of Cr Ions in Oxide Glasses", Journal of Non-Crystalline Solids, North-Holland Physics Publishing, Amsterdam, NL, vol. 220, No. 2-3, Nov. 1, 1997, pp. 139-146, XP004100595, ISSN: 0022-3093, the whole document.

* cited by examiner

SOLID-STATE DEVICES WITH RADIAL DOPANT VALENCE PROFILE

BACKGROUND OF THE INVENTION

1. Field of Invention

The present invention relates to fabrication of Q-switches and laser pump cavities. Specifically this invention relates to solid state devices having a radially dependent dopant valence state density.

2. Description of the Related Art

A laser is a device which produces a beam of coherent light. In a typical laser, an incoherent light source imparts energy to a lasing medium, which produces light in which the waves are in phase, termed coherent light, through particular electron transitions. Where the lasing medium is properly designed, the coherent light is emitted as a beam. In certain cases, it is desirable that the emitted beam of coherent light be more intense than naturally occurs from the lasing medium, and a type of laser termed a Q-switched, pulsed laser has been developed for this purpose.

The pulsed laser contains a light controller termed a Q-switch which limits the buildup of light reflecting back and forth within the laser resonator until it reaches some selected value, at which time the growth of the internal wave rapidly increases and the threshold for laser action is reached. After releasing the built-up, light energy as a pulse, the Q-switch recovers to its prior function of restraining the light energy until the intensity is high enough for another pulse. Very high peak powers and beam energies can be achieved in this manner. Electrical, mechanical, and passive Q-switches are known in the art.

In one type of passive Q-switch, a solid medium contains saturable absorbers. One type of saturable absorber is based on color centers. A color center is a crystal defect that absorbs light. In a passive Q-switch, the presence of the color centers causes the transmittance of the Q-switch to be low when the energy of the incident light beam is below the saturation intensity of color center absorption. On the other hand, a sufficiently high beam intensity causes the color centers to momentarily change or bleach so that the light beam is no longer absorbed.

U.S. Pat. No. 4,833,333 by S. C. Rand and assigned to Hughes Aircraft Company, entitled "Solid State Laser Q-Switch Having Radial Color Center Distribution", appears to teach a passive Q-switch with a radially dependent distribution of saturable color centers having the highest density at the periphery of the crystal. This patent also appears to teach fabrication of such switches by irradiating the periphery of a LiF crystal rod with electrons to produce $F_2^-$ color centers, with a higher density of color centers near the periphery than in the center. Rand appears to teach irradiation of a crystal with electrons from the side, or radially. Optionally, the crystal can also be irradiated axially with electrons or in any direction with another form of radiation having greater penetration into the crystal, such as gamma radiation, to establish a base level of saturable color centers throughout the crystal. The crystal, having the radial distribution of color centers, acts as a Q-switch, but additionally tends to reduce beam divergence and increase the brightness of the laser beam by discriminating against the higher order transverse modes otherwise allowed to propagate within the laser resonator. The stated advantage of this Q-switch configuration is that it tends to reduce beam divergence and increase the brightness of the laser beam by virtue of the nonlinear bleaching mechanism.

The beam inside the laser cavity must pass through the Q-switch. Unbleached color centers act to delay the time at which the laser reaches threshold by absorbing a fraction of the growing intra-cavity field on each pass. When the intensity reaches a value, termed the saturation intensity, which is characteristic of the density and type of color centers, the color centers bleach to a transparent state and the beam is transmitted as a short, giant pulse of energy.

Unfortunately, color center Q-switches have several shortcomings including (1) the need for an expensive 1–2 MeV electron irradiation source for fabrication (and possibly a Cobalt-60 source of gamma radiation to provide a background level of color centers), (2) a relatively long crystal, which is expensive and not generally suitable for small laser cavities of the type used in miniature, eye safe laser rangefinders, (3) relatively poor control of optical density resulting in variations in lasing threshold and efficiency and requiring selection of suitable devices (low production yield). Also, $F_2^-$ color centers are quite photosensitive and will disappear under weak UV exposure [see W. Gellermann et al, J. Appl. Phys. 61, 1297–1303 (1987)], and the color centers are somewhat temperature sensitive making them non-ideal for fielded applications.

Crystal lasers, doped with an active ion, often use one or more flashlamps or laser diodes to provide "pump light". The pump light excites ions in the doped crystal to a higher energy state. This process is known as "absorption". A "pump cavity" typically contains a uniformly doped gain medium, which may be a crystal or glass or polycrystalline element fabricated in the shape of a rod, slab, or disk; and other elements, such as a pump light reflector or relay optics. Pump light is coupled into the cavity, typically with one or more flashlamps or laser diodes, either from the side of the cavity, known as "side-pumping," or the end of the cavity, known as "end-pumping." A laser is created by placing the doped medium and pump cavity in a "resonator" that reflects photons created by spontaneous emission, i.e. those generated by the normal decay of the excited ions, and amplified by stimulated emission. For example, mirrors placed at either end of the doped medium and aligned perpendicularly to its longitudinal axis form a laser resonator. If the resonator is properly sized and a sufficient number of photons are reflected back and forth within the resonator so that the "gain" exceeds the "loss," a laser oscillation will build up from spontaneous stimulated emission, i.e. "lasing" will occur, producing laser light. Laser light is typically extracted from the doped medium in the pump cavity along the longitudinal axis. Pump cavities are discussed in W. Koechner, Solid-State Laser Engineering, 3rd edition, Springer Verlag (1992), ch. 6.

Efficient absorption, in which nearly all of the pump light is absorbed by the doped medium, is a primary goal of laser designers. One method of attaining efficient absorption is by using high-absorption (highly doped) laser materials. A ray of pump light going through a doped crystal one time is known as a "pass." With most existing designs, a pump light ray makes only one or two passes through the doped crystal before escaping, necessitating the use of high-absorption materials to achieve efficient absorption. Absorption is governed by an exponential finction. Thus, when such a crystal is side-pumped, non-uniform absorption and thus non-uniform gain often result, with the highest gain being near the edge of the lasing medium. To facilitate handling, the corners of a laser rod or slab will typically be chamfered. The chamfer will shadow or block the laser light, and since the highest gain is at the edges of the crystal, inefficient lasing results.

Another approach to the goal of high efficiency absorption uses end pumping, in which pump light comes into a pump cavity along its longitudinal axis. End pumping requires expensive high-brightness pump diodes and durable, difficult-to-produce dichroic coatings since the pumping and laser light extraction take place through the same optical surfaces (i.e. the ends of the rod) while requiring quite different reflectivity characteristics. In the case of quasi-four level or three-level systems where the high threshold requires greater pumping rate, pump "bleaching" can occur, in which a large fraction of the active ions have been excited and correspondingly fewer ions are in the ground state available for pump light absorption, resulting in reduced absorption for both side- and end-pumping geometries.

The theory of operation of the passive Q-switch is described in detail in Koechner, specifically for organic dye and radiation-induced color-center saturable absorbers [Koechner, W., Solid State Laser Engineering, 2nd Ed., Springer-Verlag, Berlin, pp 437–442 (1988).]. See U.S. Pat. No. 4,833,333.

U.S. Pat. No. 5,761,233 issued Jun. 2, 1998 to Brusselbach et al., the teachings of which are incorporated herein by reference, teaches the fabrication of a multi-element "monolithic" pump cavity using the process of diffusion bonding practiced by Onyx Optics, Inc (Dublin, Calif.). This process adds significant cost and cycle time to the manufacture of solid-state lasers and is therefore undesirable, particularly in the cost-driven eye safe laser rangefinder market for individual soldier weapon fire control systems.

Hence, a need remains in the art for solid state devices, such as Q-switches and laser pump cavities, which have radially dependent dopant densities but: 1) are fabricated without the need for an expensive 1–2 MeV electron irradiation; 2) are fabricated without the need for a Cobalt-60 source of gamma radiation to provide a background level of color centers; 3) do not require a relatively long crystal; 4) have good optical density; 5) are not photosensitive; 6) are not sensitive to weak UV exposure; 7) are not temperature sensitive and 8) are inexpensive to manufacture.

SUMMARY OF THE INVENTION

The need in the art is addressed by the teachings of the present invention. In one aspect, the invention is a material adapted for use in a solid-state laser light control device, e.g. a Q-switch, or a solid-state laser pump cavity, with a dopant at a first valence state whose concentration increases with distance from the surface. The material has the same dopant at a second valence state with a concentration which decreases with distance from the surface. In the illustrative embodiment, the sum of these concentrations is constant. The present invention also provides a novel fabrication method. In its broadest description, this method comprises the steps of doping a solid-state material with a dopant at a first valence state and exposing the solid-state material at elevated temperature, for a period of time, to an atmosphere designed to change the valence state of the dopant to a second valence state. The elevated temperature, which should be below the melting point and preferably below the glass transition temperature of the solid-state material, and the time of exposure are selected to change this valence state as a function of the distance from the surface of the solid state material. The atmosphere can be either oxidizing or reducing.

By tailoring the time and temperature in the oxidizing or reducing atmosphere, the radial profile of the different valence states, can be controlled in a similar fashion to a normal impurity diffusion process, as governed by Fick's laws. Fick's first law for diffusion in a concentration gradient states that "the flux density is directly proportional to the concentration gradient." [Ghandhi, S. K. The Theory and Practice of Microelectronics, John Wiley & Sons, Inc, New York, p. 59–85, 1968.] Fick's second law states that "the time rate of change of volume concentration of impurities is directly proportional to the second derivative of the volume concentration with respect to the distance." [Ghandhi, S. K. The Theory and Practice of Microelectronics, John Wiley & Sons, Inc, New York, p. 59–85, 1968.] The solutions for Fick's diffusion laws for many physical geometries and boundary conditions are given in the heat flow literature, and numerical solutions can also be found for arbitrary geometries and boundary conditions using finite element thermal analysis computer codes such as NASTRAN Thermal Analyzer.

For Q-switches, the dopant and valence states are selected to create a radial variation in the optical density of the material at the lasing wavelength. For laser pump cavities, the dopant and valence states are selected to create a radial variation in the net gain of the lasing medium. The present invention offers improved mode discrimination within a laser resonator, and results in a lower beam divergence and higher brightness output.

In an illustrative Q-switch implementation of the present teachings, a solid-state material, such as a yttrium aluminum garnet (YAG) crystal rod, is doped with trivalent chromium ions ($Cr^{3+}$). The material, disposed in the rod, is subjected to an oxidizing atmosphere at elevated temperature in a post-fabrication process that converts the trivalent chromium ions near the periphery of the rod's cylindrical surface to the tetravalent state ($Cr^{4+}$). The rod is then cut into disks which have a radially-dependent distribution of valence states with the highest density of tetravalent states near the periphery and lowest at the center. The trivalent chromium ions are essentially transparent to 1.064 micrometer radiation from a Nd:YAG laser. The tetravalent ions, however, absorb at this wavelength on a transition that bleaches (becomes transparent) at high laser radiation intensities. When inserted into a Nd:YAG laser cavity, the disk acts as a saturable absorber Q-switch that bleaches first in the center and provides a higher optical density toward the periphery, thereby discriminating against the larger (higher order) transverse modes within the laser resonator. The result is that the lower order modes prevail and yield a higher beam quality (lower beam divergence and higher brightness). An additional advantage is that the invention also serves as a soft apodizing aperture to "gracefully" provide mode discrimination without any hard edges that would otherwise create deleterious diffraction effects.

The fabrication apparatus is straightforward, relatively inexpensive and can be implemented as part of a crystal or glass fabrication process. The finished product is in a configuration suitable for numerous applications, including very small resonators. High product quality is readily achieved with standard manufacturing processes. Furthermore, the fact that the saturable absorption is due to a substitutionally doped ionic species (as opposed to a radiation-damage-induced color-center defect) means that the present invention is much more stable against light exposure and temperature. This stability feature is an important benefit for many military and industrial laser applications.

In an illustrative laser pump cavity implementation of the present teachings, a solid-state material, such as a YAG crystal rod, is doped with trivalent ytterbium ions ($Yb^{3+}$). The material, disposed in the rod, is subjected to a reducing atmosphere at elevated temperature in a post-fabrication process that converts the trivalent ytterbium ions near the periphery of the rod's cylindrical surface to the divalent state ($Yb^{2+}$).

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
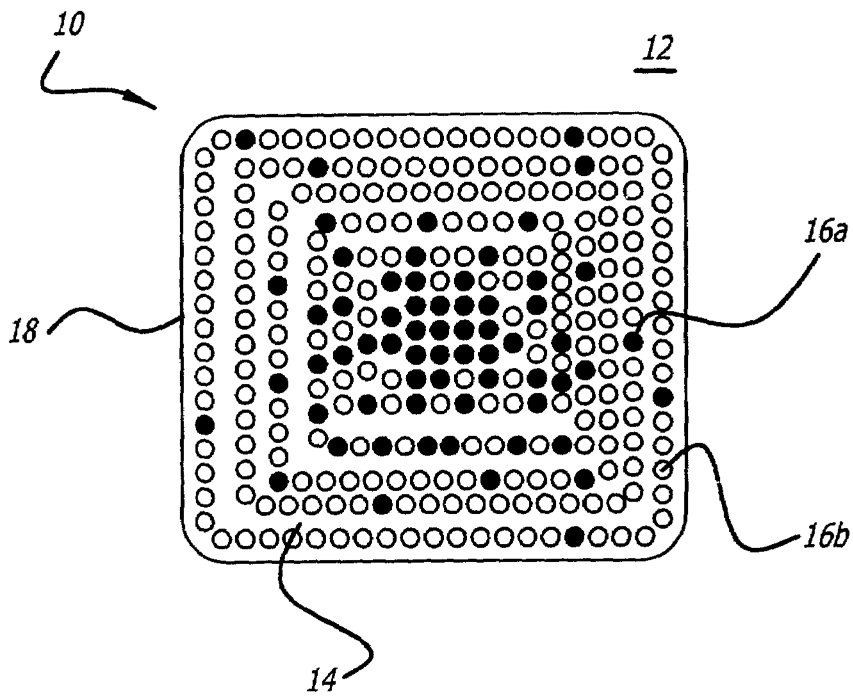
FIG. 1 is a diagram showing a cross-section of a generic solid-state device fabricated in accordance with the teachings of the present invention.

FIG. 1 is a cross-section of a generic, solid state, laser light control device fabricated in accordance with the teachings of the present invention. The device 10 consists essentially of a solid-state host material 14 which contains: a dopant species 16 at a first valence state 'a', the concentration of which increases with distance from the surface 18; and the same dopant species 16 at a second valence state 'b', the concentration which decreases with distance from the surface 18. This device 10 is produced by exposing the solid-state material 14, which is initially uniformly doped with the dopant species 16 at the first valence state 'a', at elevated temperature, for a period of time, in an atmosphere 12 designed to change the valence state of the dopant 16 to the second valence state 'b'. The elevated temperature, which should be below the melting point and preferably below the glass transition temperature of the solid-state material 14, and time of exposure are selected to change this valence state in as a function of distance from the surface 18 of the solid-state material 14. Consequently, the sum of the concentration of the valence states 'a' and 'b' is a constant at any point in the material 14.

Figure 2:
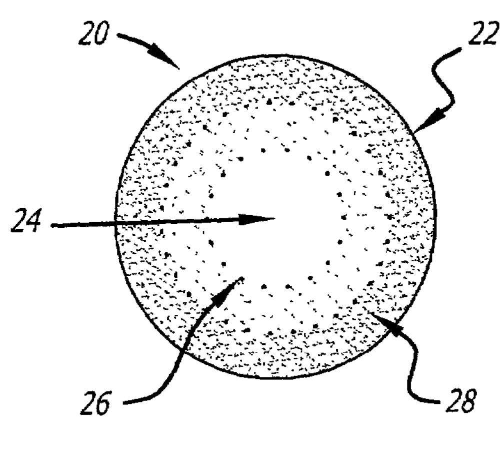
FIG. 2 is a diagram showing a cross-section of a saturable absorber Q-switch fabricated in accordance with the teachings of the present invention.

FIG. 2 shows a cross-section of a passive saturable absorber Q-switch 20 fabricated according the teachings of this invention. Shading represents the concentration of $Cr^{4+}$ ions—the deeper the shading the higher the concentration. In one practical embodiment, the material is chromium doped yttrium aluminum garnet (Cr:YAG). The crystal is grown with a homogenous concentration of chromium ions in the trivalent state ($Cr^{3+}$), which do not absorb appreciably at the laser wavelength (1.06 $\mu$m).

Figure 3:
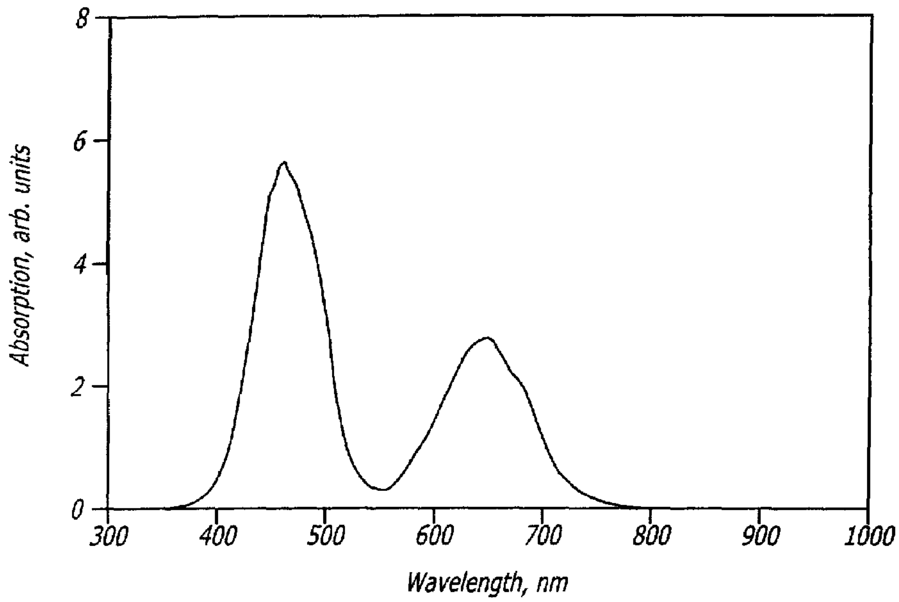
FIG. 3 is a diagram showing the room-temperature absorption spectrum of trivalent chromium ($Cr^{3+}$) ions in a garnet host crystal.

FIG. 3 is a graph showing a typical room-temperature absorption spectrum of $Cr^{3+}$ in a garnet host crystal. The absorption consists of two strong and broadband features centered at approximately 460 and 640 nm in the visible, with no appreciable absorption in the near-infrared region of the electromagnetic spectrum.

In a post-processing operation, in accordance with an illustrative implementation of the present method, the entire crystal is heated to a temperature below its melting point in an oxidizing atmosphere, (e.g. air, molecular oxygen, or ozone) typically overnight causing the $Cr^{3+}$ ions near the surface to be converted to the tetravalent state ($Cr^{4+}$). Diffusion of the oxidizing gas toward the center of the crystal produces a radially-dependent concentration distribution of $Cr^{4+}$, with the highest concentration near the barrel surface 22 of the cylindrical crystal and the lowest concentration in the core region 24. The tetravalent ions absorb at the laser wavelength, however the electronic transition responsible for the absorption saturates or "bleaches" as the incident intensity of the laser increases. A typical room-temperature absorption spectrum of $Cr^{4+}$ in GSGG is shown in FIG. 4.

Figure 4:
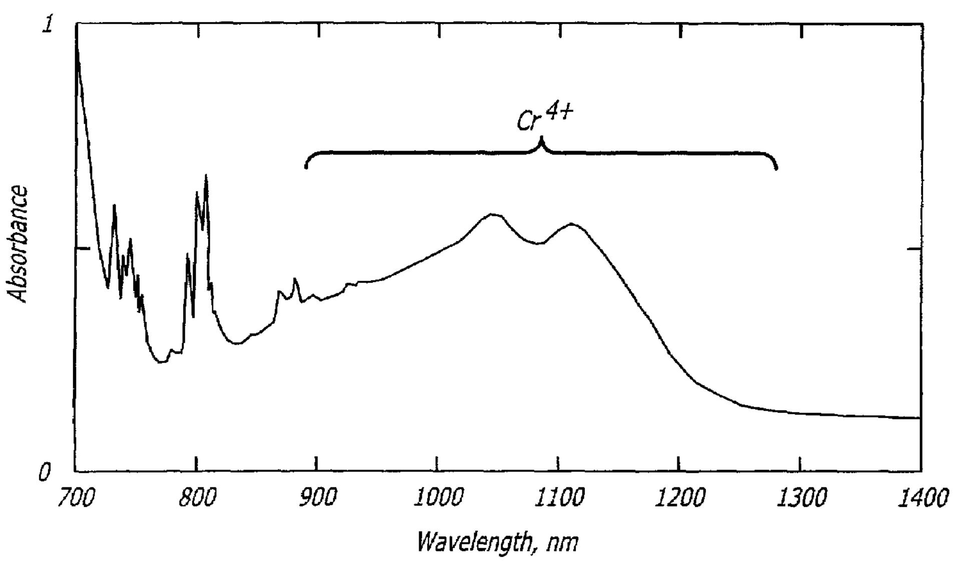
FIG. 4 is a diagram showing the near-IR room-temperature absorption spectrum of $Cr^{4+}$ in gadolinium scandium gallium garnet (GSGG).

FIG. 4 is a diagram showing the near-infrared room-temperature absorption spectrum of $Cr^{4+}$ in GSGG. A broad featureless double-humped absorption peak is centered near 1100 nm. The sample path length was 2.6 mm. The sharp features near 800 nm and the strong broad shoulder at 700 nm are both due to other ionic species. The $Cr^{4+}$ absorption spectrum in YAG is quite similar given that YAG and GSGG are both garnet structures.

The absorption coefficient of the $Cr^{4+}$ ion is related to the incident laser intensity, as given below:

$$\gamma = \frac{\gamma_0}{1 + (I/I_s)} \quad [1]$$

where: $\gamma$=absorption coefficient $\gamma_0$=absorption at zero intensity

I=incident laser intensity $I_S$=saturation intensity (spectroscopic property of transition)

As the laser intensity builds in the cavity, the Q-switch will begin to open near the core of the crystal 24 where the concentration of tetravalent chromium ions is the lowest. This will allow the low order transverse modes 26 to build first and thereby discriminate against the higher order modes 28 which must occupy a region of higher loss. The origin, structure, and discrimination of transverse modes in a laser resonator is described in detail in Koechner, referenced previously. Low order transverse modes 26 produce an output beam that has low beam divergence and high brightness, which is the primary advantage of the radially-dependent density distribution.

Figure 5:
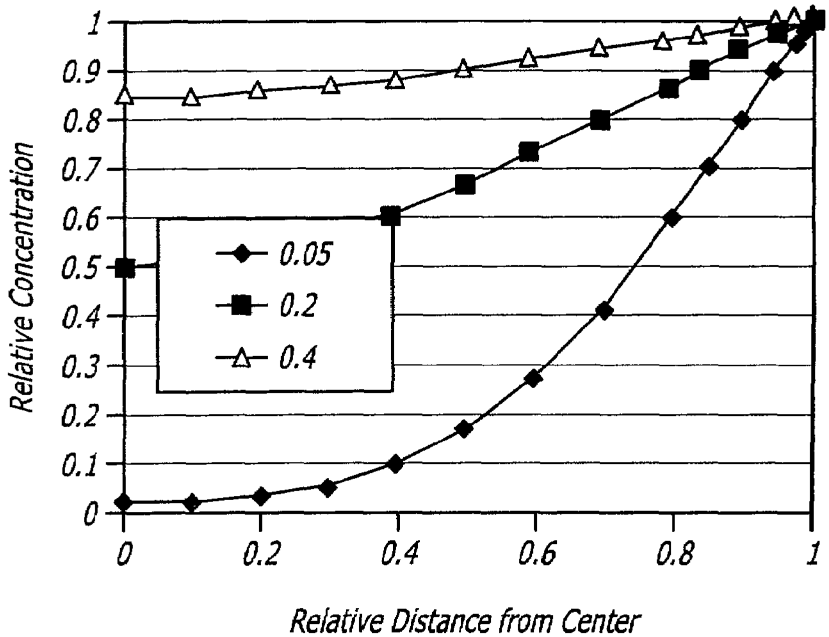
FIG. 5 is a graph showing approximate distribution of $Cr^{4+}$ ions in cylindrical Q-switches.

As stated earlier, the process by which the trivalent chromium ions near the periphery of the Q-switch are converted to the tetravalent state is believed to be governed by Fick's laws for diffusion in a concentration gradient. The solution to the diffusion equation under the present boundary conditions is given as:

$$n_{4+}(r,t) = n_i\left[1 - \sum_{\nu=1}^{\nu=\infty} \frac{2}{\beta_\nu J_1(\beta_\nu)} e^{-\beta_\nu^2 Dt/R^2} J_0\left(\beta_\nu \frac{r}{R}\right)\right] \quad [2]$$

where: $n_{4+}$ (r,t)=tetravalent ion concentration as a function of radial distance and time from initial condition $n_i$=trivalent ion concentration at surface of cylinder D=diffusion constant t=time from initial condition R=radius of cylinder r=radial distance within the cylinder $J_0$=the Bessel function of first kind and zero order $J_1$=Bessel function of first kind and first order, and $\beta_\nu$=the νth zero place of $J_0$ FIG. 5 shows a graph for the approximate radial distribution of tetravalent ions within the crystalline cylinder as a function of the product of D and t (see above), indicating that (1) the process is controllable to give a desired diffusion depth and (2) the distribution of tetravalent ions will provide the desirable low absorption coefficient in the center of the Q-switch corresponding to the low order transverse modes and high absorption coefficient near the periphery, where higher order modes are discriminated. While FIG. 5 shows relative concentration as a function of relative distance from the center, it is a simple matter to calculate relative concentration as a function of distance from the surface. All that is necessary is to subtract the relative distance from the center from 1.

The Q-switch embodiment of this invention can also be achieved with a two-step diffusion process. This provides a "background" concentration of $Cr^{4+}$ ions similar to the background level of $F_2^-$ color centers as taught by Rand in U.S. Pat. No. 4,833,333, but without the need for a Cobalt-60 source of gamma radiation. (The teachings of U.S. Pat. No. 4,833,333 are incorporated by reference herein.) Two-step diffusion processes are well understood in the semiconductor manufacturing business, where they are used extensively to generate well-controlled impurity (donor and acceptor) concentration profiles.

A uniform "background" concentration is created, for example, by first subjecting the starting crystal, which contains $Cr^{3+}$, to an oxidizing atmosphere at elevated temperature for a prescribed period of time to produce a desired total number of tetravalent ions per unit length along the cylindrical surface (this is referred to in the semiconductor industry as a "pre-deposition" process). The oxidizing atmosphere is then removed and the crystal is heated to a reasonable diffusion temperature (significant fraction of melting point for overnight typically under oxidizing atmosphere such as air, molecular oxygen, or ozone) and the ions are allowed to diffuse toward the center of the crystal (this is referred to in the semiconductor industry as a "drive-in" diffusion process). Long diffusion times will produce a nearly uniform background of $Cr^{4+}$ ions. This two-step process may then be followed by a one-step process (described earlier), or another two-step process in order to create a sharp transition from high tetravalent ion concentration at the surface to lower concentration in the center.

Finite element thermal modeling may be used to simulate all of these diffusion processes by modeling the ion concentration as a temperature and the diffusion coefficient as a thermal conductivity.

While a very specific example has been provided above for the Q-switch embodiment of this invention, it will be obvious to those who are most familiar with the art to which this invention pertains that this invention is applicable to all crystalline, polycrystalline, and glassy materials that can be used in fabrication of solid state devices. The materials are too numerous to be listed in this document. Some of them are referenced in B. Wechsler and D. Sumida, "Laser Crystals", in CRC Handbook of Laser Science and Technology, Supplement 2: Optical Materials, M. J. Weber, ed, CRC Press, Boca Raton, p. 595–616 (1995) and L. DeShazer, S. Rand, and B. Wechsler, "Laser Crystals," in CRC Handbook of Laser Science and Technology, Vol. V, M. J. Weber, ed, CRC Press, Boca Raton, p. 281–338 (1987), which are hereby incorporated by reference. Laser glasses are described in Charles F. Rapp, "Laser Glasses: Bulk Glasses", CRC Handbook of Laser Science and Technology, Supplement 2: Optical Materials, M. J. Weber, ed, CRC Press, Boca Raton, p. 619–634 (1995) and Steven T. Davey, B. James Ainslie, and Richard Wyatt, ""Laser Glasses: Waveguide Glasses", CRC Handbook of Laser Science and Technology, Supplement 2: Optical Materials, M. J. Weber, ed, CRC Press, Boca Raton, p. 635–668 (1995), which are hereby incorporated by reference. Polycrystalline materials are described in J. Lu et al, Appl. Phys. B, 71, 469 (2000), J. Lu et al, Jpn J. Appl. Phys, 39, 1048 (2000), and I. Shoji et al, Appl. Phys. Letts, 77, 939 (2000), which are also hereby incorporated by reference. Examples of oxides are yttrium-aluminum-garnet, yttrium vanadate ($YVO_4$) and yttrium othosilicate ($Y_2SiO_5$).

Likewise there are numerous dopants that can be incorporated. Table 1 lists a number of solid-state ions that can exist in more than one valence state within a host material [see R. D. Shannon, "Revised Effective Ionic Radii and Systematic Studies of Interatomic Distances in Halides and Chalcogenides," Acta Cryst. A32, pp. 751–767 (1976)] and that have indicated saturable absorber Q-switching potential based on an extensive literature search on the INSPEC database. Note that the database entries start in 1969 so any published information before 1969 is not included. Therefore, the list in Table 1 is not represented to be an exhaustive list of possible ions; and it should be understood that the methods of saturable Q-switch design and operation using ionic valence conversion as taught in this invention disclosure may be applied to other dopants not listed.

TABLE 1

Saturable Absorber Q-switch Ions for Valence Conversion in a Solid-State Host

| Element | Possible Valence States |
|---|---|
| Samarium (Sm) | 2+, 3+ |
| Europium (Eu) | 2+, 3+ |
| Dysprosium (Dy) | 2+, 3+ |
| Uranium (U) | 3+, 4+ |
| Vanadium (V) | 2+, 3+, 4+, 5+ |
| Chromium (Cr) | 2+, 3+, 4+ |
| Cobalt (Co) | 2+, 3+ |
| Manganese (Mn) | 4+, 5+, 6+ |

This invention is applicable to high beam quality Q-switched solid-state laser systems and can be applied to numerous laser wavelengths for which compatible Q-switch materials exist. The $Cr^{4+}$ Q-switch is compatible with Nd:YAG, Nd:YLF and Nd:glass systems. The $U^{4+}$ and $Co^{2+}$ Q-switches are compatible with state-of-the-art Er:Yb:glass systems.

This invention is also applicable to high pulse rate erbium-based eyesafe lasers for advanced multifunction range finding applications, including range profiling (3-D imaging). The present Er:Yb:glass approach used in eyesafe laser rangefinders uses a diffusion-bonded pump cavity which is expensive to manufacture and, because of the glass host, is not scalable to higher average power. The present invention provides a low cost manufacturing approach for crystalline lasers, which are scalable to the higher powers for future soldier and ground/air vehicle applications.

Figure 6:
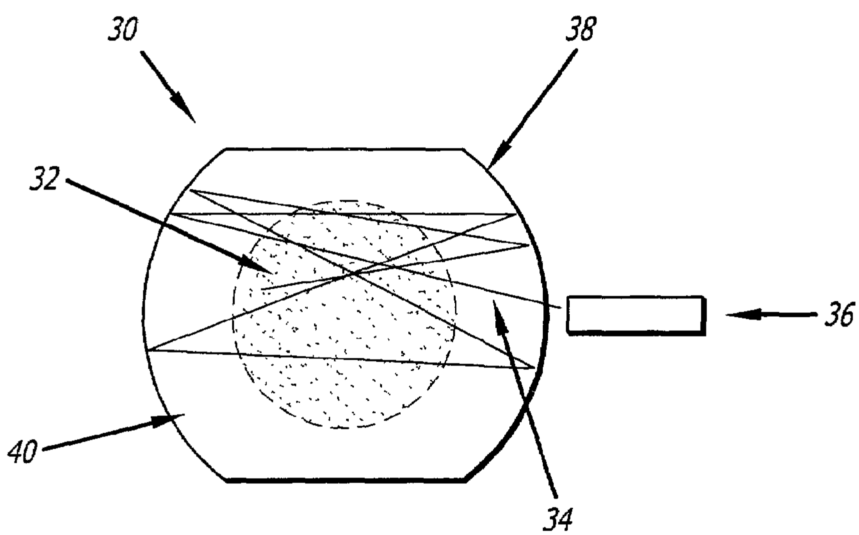
FIG. 6 is a diagram of a cross-section of a multi-pass integrating laser pump cavity fabricated in accordance with the teachings of this invention.

FIG. 6 shows a cross section of a multi-pass integrating laser pump cavity 30 fabricated according the teachings of this invention. Shading represents the concentration of $Yb^{3+}$ ions—the deeper the shading the higher the concentration. In one practical embodiment, the material is ytterbium doped yttrium aluminum garnet (Yb:YAG) or erbium and ytterbium co-doped into a phosphate glass host (Er:Yb: Glass). In the core lasing region 32 trivalent ytterbium ions absorb the pumplight rays 34 from 940 nm or 980 nm laser diodes 36 as they traverse the core region 32 over multiple passes. The surface of the cavity 38 is optically figured to provide efficient multi-pass pumping of the core lasing region 32. For the case of Er:Yb:Glass, the excited trivalent ytterbium ions transfer energy to the erbium ions in an efficient cross-relaxation process, causing a population inversion in the erbium which amplifies 1.5 $\mu$m laser radiation through stimulated emission. An outer annular region 40 is created by processing the crystal in a suitable reducing atmosphere, which may include hydrogen gas or forming gas (e.g. hydrogen and argon mixture), and at a temperature approaching the melting point, which allows the trivalent ytterbium ions to be reduced to the divalent state. The processing temperature, time, pressure and concentration of reactants in the atmosphere are selected to tailor the distribution of divalent vs. trivalent ions in the transition region between the outer surface of the cavity 38 and the inner core lasing region 32 for best lasing performance. The divalent ytterbium ions in the outer annular region 40 do not strongly absorb at the pump wavelength allowing the pumplight to be transmitted efficiently to the core lasing region.

An additional benefit can be achieved if the divalent ytterbium ions in the outer annular region 40 absorb at the lasing wavelength, which may occur with some ions in some hosts. This acts to suppress amplified spontaneous emission and parasitic lasing in the plane essentially transverse to the lasing direction, thereby minimizing losses in lasing efficiency due to these undesired effects.

As stated earlier, the process by which the trivalent ytterbium ions near the periphery 40 of the integrating pump cavity 30 are converted to the divalent state is believed to be governed by Fick's laws for diffusion in a concentration gradient. For the following analysis of valence conversion from a constant concentration reducing atmosphere within a cylindrical crystal geometry, the following two assumptions are made: (1) the crystal is impermeable to the reducing agent (such as hydrogen gas or hydrogen/argon mixture) in the atmosphere surrounding the crystal and (2) the reducing process is sufficiently rapid relative to the diffusion of ions within the crystal that all of the ytterbium ions near the surface of the cylinder are converted to the divalent state.

Figure 7:
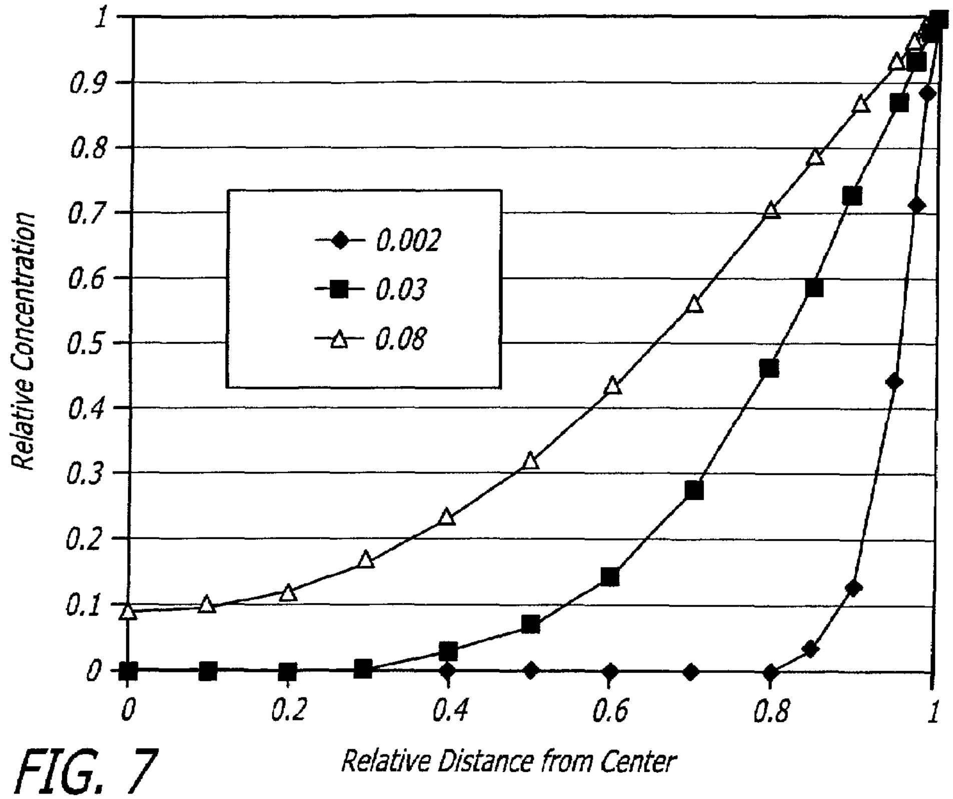
FIG. 7 is a graph showing approximate distribution of $Yb^{2+}$ ions in a cylindrical pump cavity.
Figure 8:
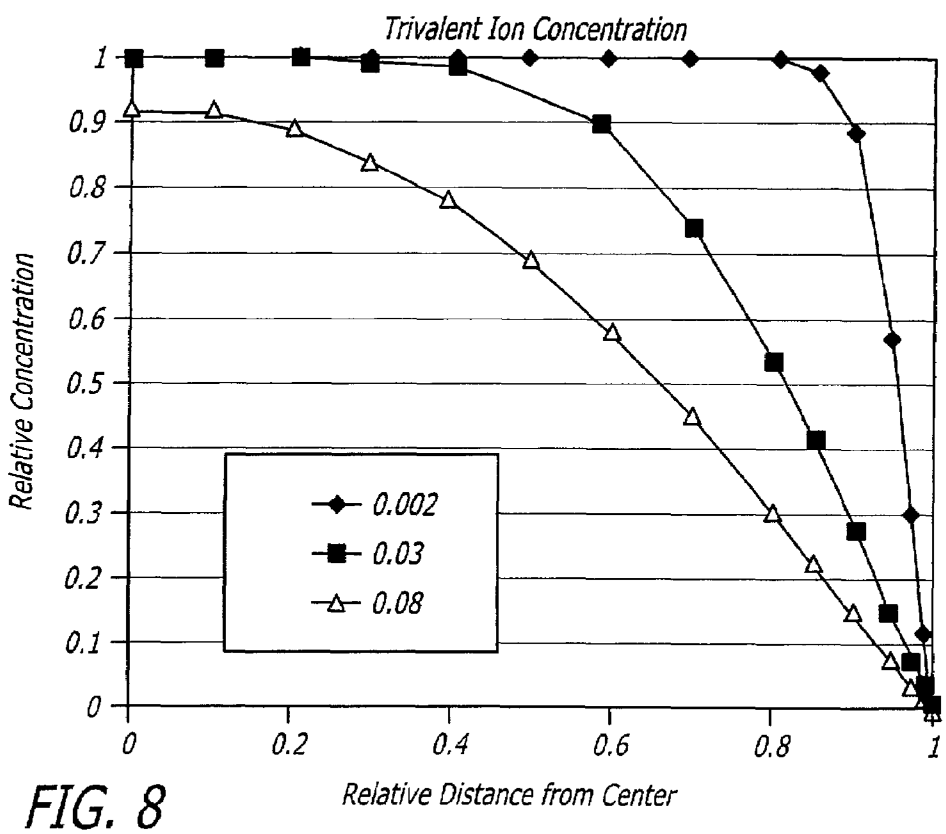
FIG. 8 is a graph showing approximate distribution of $Yb^{3+}$ ions in a cylindrical pump cavity.

This situation is equivalent to thermal diffusion within an infinitely long thermally-conducting cylinder, where the temperature of the surface is changed instantaneously and held constant. The solution to the diffusion equation under these boundary conditions is given in the literature [M. Jakob, Heat Transfer, John Wiley & Sons, Inc., New York, pp. 261–268 (1949)] as:

$$n_{2+}(r,t) = n_i\left[1 - \sum_{v=1}^{v=\infty} \frac{2}{\beta_v J_1(\beta_v)} e^{-\beta_v^2 Dt/R^2} J_0\left(\beta_v \frac{r}{R}\right)\right] \quad [3]$$

where: $n_{2+}$ (r,t)=divalent ion concentration as a function of radial distance and time from initial condition $n_i$=divalent ion concentration at surface of cylinder D=diffusion constant t=time from initial condition R=radius of cylinder r=radial distance within the cylinder $J_0$=the Bessel function of first kind and zero order $J_1$=Bessell function of first kind and first order, and $\beta_v$=the νth zero place of $J_0$ FIG. 7 shows a graph of the approximate radial distribution of divalent ions and FIG. 8 shows a graph of the approximate radial distribution of trivalent ions within the crystalline cylinder as a function of the product of D and t (see above), indicating (1) that the process is controllable to give a desired diffusion depth and (2) that the distribution of active trivalent ions will provide the desirable high gain in the center 32 of the rod 30 while minimizing absorption loss near the periphery 40, where there is no extraction by the lasing mode. Note that the total concentration of ytterbium ions is constant, therefore the $Yb^{3+}$ concentration, $n_{3+}$, is just $n_i - n_{2+}$.

While a very specific example has been provided above for the cavity embodiment of this invention, it will be obvious to those who are most familiar with the art to which this invention relates that this invention is applicable to all oxide, crystalline, polycrystalline, and glassy materials that can be used in fabrication of solid-state devices. The materials are too numerous to be listed in this document. Some of them are referenced in B. Wechsler and D. Sumida, "Laser Crystals", in CRC Handbook of Laser Science and Technology, Supplement 2: Optical Materials, M. J. Weber, ed, CRC Press, Boca Raton, p. 595–616 (1995) and L. DeShazer, S. Rand, and B. Wechsler, "Laser Crystals," in CRC Handbook of Laser Science and Technology, Vol. V, M. J. Weber, ed, CRC Press, Boca Raton, p. 281–338 (1987), which are hereby incorporated by reference. Laser glasses are described in Charles F. Rapp, "Laser Glasses: Bulk Glasses", CRC Handbook of Laser Science and Technology, Supplement 2: Optical Materials, M. J. Weber, ed, CRC Press, Boca Raton, p. 619–634 (1995) and Steven T. Davey, B. James Ainslie, and Richard Wyatt, ""Laser Glasses: Waveguide Glasses", CRC Handbook of Laser Science and Technology, Supplement 2: Optical Materials, M. J. Weber, ed, CRC Press, Boca Raton, p. 635–668 (1995). Polycrystalline materials are described in J. Lu et al, Appl. Phys. B, 71, 469 (2000), J. Lu et al, Jpn J. Appl. Phys, 39, 1048 (2000), and I. Shoji et al, Appl. Phys. Letts, 77, 939 (2000), which are also hereby incorporated by reference. Examples of oxides are yttrium-aluminum-garnet, yttrium vanadate ($YVO_4$) and yttrium othosilicate ($Y_2SiO_5$).

Figure 9:
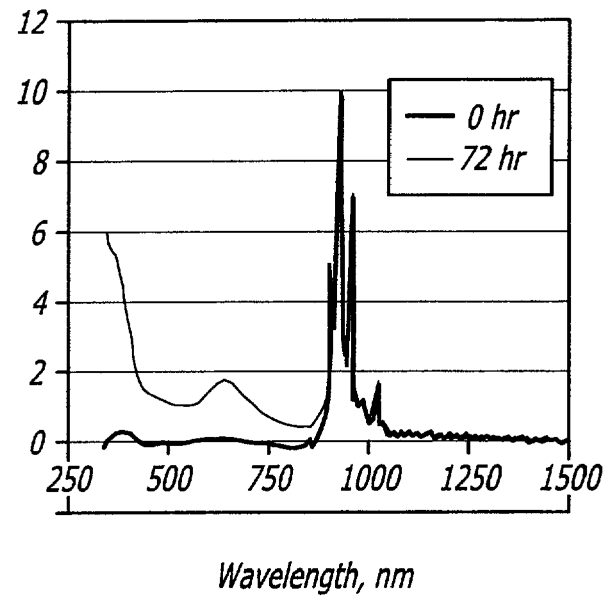
FIG. 9 is a graph showing absorption spectra for 10% Yb:YAG before and after heat treatment at 1400° C. in forming gas (hydrogen/argon mixture) for 72 hours.

As an example of this technique, FIG. 9 shows the absorption spectra of Yb:YAG before and after the heat treatment. The conversion of the trivalent Yb ions into divalent Yb ions is clearly shown by the appearance of a strong broad absorption feature in the visible region after the sample was soaked for several days at 1400° C. in an atmosphere of forming gas. This feature is completely absent in the "before" sample spectrum.

Likewise there are numerous dopants that can be incorporated. Table 2 lists a number of the solid-state ions that can exist in more than one valence state within a crystalline host, based on Shannon. [R. D. Shannon, "Revised Effective Ionic Radii and Systematic Studies of Interatomic Distances in Halides and Chalcogenides," Acta Cryst. A32, pp. 751–767 (1976)]. The first ionic valence state listed is that which has shown lasing per Kaminskii. [A. A. Kaminskii, Laser Crystals: Their Physics and Properties, 2nd Ed., Berlin, Germany, Springer-Verlag (1990)]. The second ionic valence state (and the third in some cases) listed is the reduced or oxidized valence state per Table 1 in Shannon's paper. From the literature, it appears that the easiest ions to convert between the 2+ and 3+ valence states are Sm, Eu, and Yb. Also, because $Tm^{3+}$ is a quasi-four-level system, it is a good candidate based on similarity with the $Yb^{3+}$ system.

TABLE 2

Lasing Ions for Valence Conversion in a Solid-State Host

| Element | Lasing Valence State | Other Valence State(s) |
|---|---|---|
| Ytterbium (Yb) | 3+ | 2+ |
| Cerium (Ce) | 3+ | 4+ |
| Praseodymium (Pr) | 3+ | 4+ |
| Neodymium (Nd) | 3+ | 2+ |
| Terbium (Tb) | 3+ | 4+ |
| Dysprosium (Dy) | 3+ | 2+ |
| Thulium ™ | 3+ | 2+ |
| Samarium (Sm) | 3+ | 2+ |
| Europium (Eu) | 3+ | 2+ |
| Uranium (U) | 3+ | 4+ |
| Vanadium (V) | 2+ | 3+ |
| Chromium (Cr) | 3+ | 4+, 2+ |
| Cobalt (Co) | 2+ | 3+ |
| Nickel (Ni) | 2+ | 3+ |
| Titanium (Ti) | 3+ | 2+, 4+ |
| Iron (Fe) | 2+ | 3+ |
| Manganese (Mn) | 5+ | 4+, 6+ |

The pump cavity 30 of the illustrative embodiment of this invention is an improvement on U.S. Pat. No. 5,761,233, entitled "Monolithic Pump Cavity and Method," the teachings of which are incorporated by reference herein. It achieves the advantages of the multi-element diffusion-bonded pump cavity, namely (1) a laser mode size that is larger than the doped core and (2) efficient side pumping through multi-pass absorption of the pumplight. However, by eliminating the time consuming diffusion-bonding process, it is less expensive to manufacture. The pump cavity 30 consists of a laser material, such as a crystalline laser rod that has been co-doped with erbium (lasing ion) and ytterbium (sensitizing ion). The rod is subjected to a reducing atmosphere at elevated temperature in a post-fabrication process that converts the trivalent ytterbium ions near the periphery of the rod's cylindrical surface and ends to a divalent state. The rod is then optically shaped for best integrating pump cavity performance and coated for high multi-pass efficiency, using standard multi-layer high reflectivity dielectric coatings. The divalent ytterbium ions do not absorb the pump light and cannot sensitize the erbium ions in the outer annulus 40 of the rod and therefore lasing can occur only in the central "core" 32. In some embodiments, the divalent region near the rod ends will be removed, leaving a continuous active lasing region throughout the entire rod length.

Figure 10:
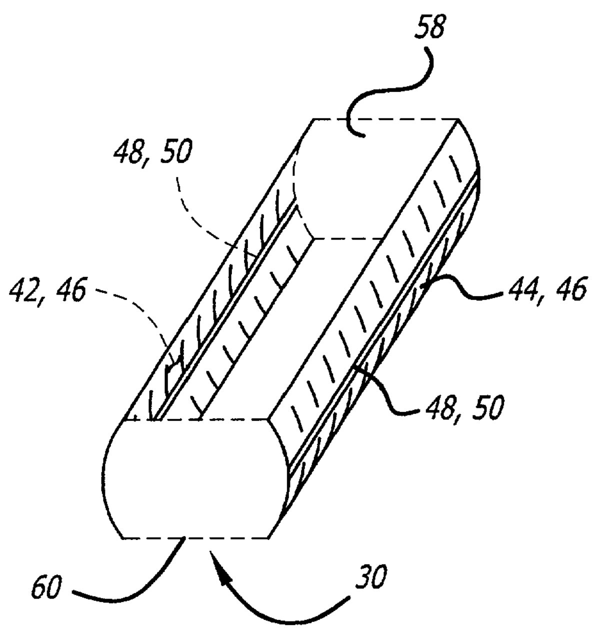
FIG. 10 is a perspective view of coatings applied to the curved pump cavity with the rest of the pump cavity indicated in dashed lines.

As shown in FIG. 10, the cavity 30 preferably has two opposing curved sides 42, 44 that run the full length of the cavity 30 along its longitudinal axis. The outer surfaces of the two curved sides 42, 44 are coated with a high-reflectivity dielectric coating 46, with the exception of a narrow slit-shaped area 48 that runs down the center of at least one, and preferably both, of the two curved sides. Pump light enters the pump cavity 30 through the slit-shaped areas 48, which are therefore not given a highly-reflective coating. Preferably, these areas receive a coating 50 that is anti-reflective at the wavelength of the pump light, to minimize pump light losses.

It is advisable to cool the cavity 30 because the optical processes occurring within it generate a significant amount of heat. To accomplish this, some form of heat sinking must be used, requiring physical contact with the surface 38 of the crystal. The cavity's two opposing curved sides 42, 44 are used to admit and reflect pump light 34; attaching heat sinks to them would interfere with the adjacent pump light sources 36. Thus, heat can only be removed from the sides of the cavity not being used to redirect pump light 34. Preferably, the cavity's opposed sides 58, 60 between its curved sides 42, 44 are flat, making it easy for them to interface with metal heat sink blocks, though non-flat surfaces could be used as well.

Figure 11:
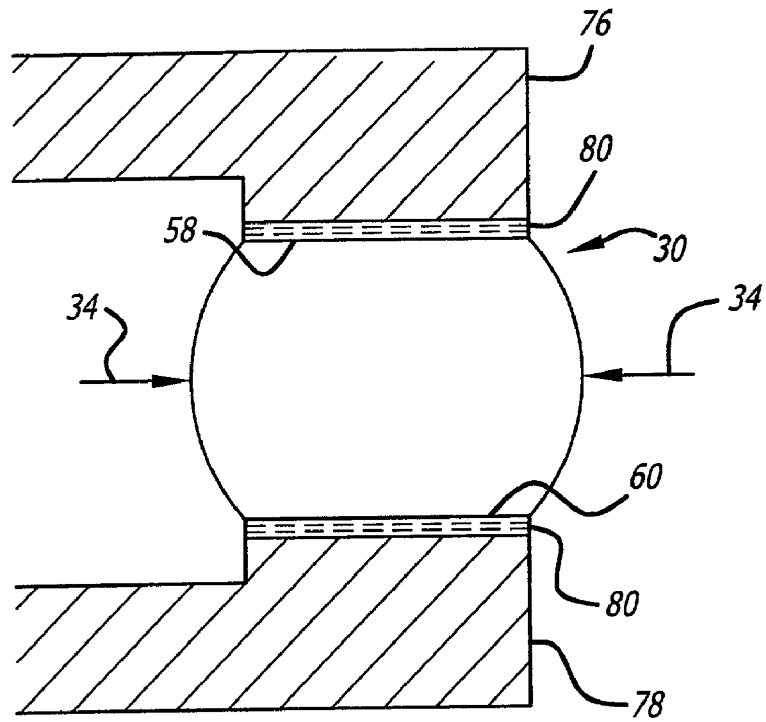
FIG. 11 illustrates a preferred method of removing heat from the pump cavity version of this invention.

A preferred method of accomplishing heat removal is illustrated in FIG. 11. Heat sink blocks 76, 78, preferably made of copper and water cooled, interface with the cavity 30 along its full length through a thin layer 80 of indium. The indium 80 provides good thermal contact between crystal 30 and blocks 76, 78, and also acts as a cushioning layer, to reduce strain on the crystal 30. These flat surfaces 58, 60, are finely ground and not highly reflecting, thus aiding in suppression of parasitic oscillation. The intimate direct contact with the optical surface reduces the refractive index mismatch as compared with a crystal to air interface, thus lowering the Fresnel reflection and therefore reducing the parasitic feedback.

Figure 12:
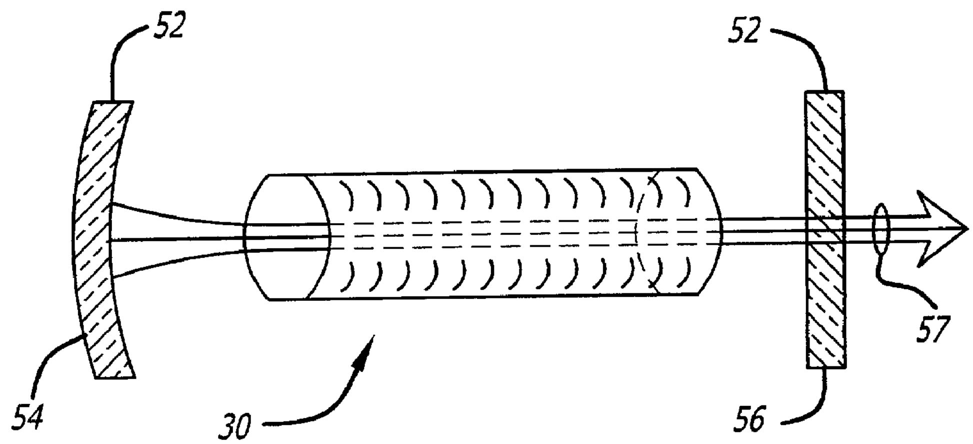
FIG. 12 is a perspective view of the preferred pump cavity as a component of a crystal laser.

By placing the present pump cavity 30 within a resonator 52, as shown in FIG. 12, a laser can be made. A resonator 52 typically consists of a 100% reflector 54 and a partial reflector 56, with the distance between reflectors 54, 56 selected to provide laser light at a particular wavelength. Laser light 57 emerges from the resonator 52 through partial reflector 56. The invention can be used as a component for many types of lasers, including Q-switched, continuous wave, mode-locked and normal mode types. Other applications for the pump cavity 30 include its use as a master oscillator for a multi-kilowatt master oscillator power amplifier, a master oscillator for industrial laser power amplifiers (operating long-pulsed), and a pump for fiber lasers as might be used as laser radar sources.

The pump embodiment 30 of the present invention obviates the need for the diffusion-bonding step by creating an annular region 40 of low pump light absorption around an active core 32 within the laser rod. The present invention has the following advantages over the prior art: (1) one-piece construction, (2) one optical fabrication (grinding/polishing) step, (3) no optical discontinuities within the laser mode volume, (4) smooth gain profile with highest gain in the rod center, and (5) high manufacturing yield.

In the pump embodiment 30, trivalent ytterbium ions in a suitable host crystal are converted to the divalent state with post processing in an appropriate reducing atmosphere at elevated temperature. By tailoring the time and temperature in the reducing process, the profile of divalent and trivalent ions can be controlled in a similar fashion to a normal impurity diffusion process. Ytterbium is one of a class of useful lasing ions that can enter a host crystal in more than one valence state, and therefore offers several possibilities for using a partial valence conversion to spatially alter the spectroscopic characteristics of the crystalline lasing medium. This invention disclosure describes two such possibilities in detail, namely (1) the fabrication of a multi-pass integrating diode pump cavity from a single Yb:YAG crystal for a laser trnsmitter that may be used in a continuous wave (CW) or high pulse rate imaging 3-dimensional laser radar sensor for situation awareness, navigation, and targeting and (2) the fabrication of a similar pump cavity from a single erbium/ytterbium co-doped phosphate glass rod for eyesafe laser rangefinders that may be used for helicopter, combat vehicle, or soldier weapon fire control.

While both the Yb:YAG (1.03 $\mu$m wavelength) and Er:Yb:Glass (eyesafe 1.5 $\mu$m) laser systems provide very practical embodiments of this invention, it should be understood that the method of valence conversion to alter the spectroscopic characteristics of solid-state materials is more general in its applications, which range from integrating laser pump cavities to spatially tailored saturable absorbers used as passive Q-switches.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is therefore intended by the appended claims to cover any and all such applications, modifications and embodiments within the scope of the present invention.

The invention claimed is:

1. A solid state material containing:

a dopant species at a first valence state and said dopant species at a second valence state;

wherein the concentration of said dopant species at said first valance states increases with distance from a surface of said material and the concentration of said dopant species at said second valence state decreases with distance from said surface.

2. The invention of claim 1 wherein the sum of said concentrations is a constant.

3. The invention of claim 1 wherein said solid state material is selected from the group consisting of yttrium-aluminum-garnet, yttrium vanadate and yttrium orthosilicate.

4. The invention of claim 1 wherein said solid state material is selected from the group consisting of crystalline, polycrystalline, and glassy.

5. The invention of claim 1 wherein said dopant species is selected from the group consisting of samarium; europium, dysprosium, uranium, vanadium, chromium, cobalt, manganese, ytterbium, cerium, praseodymium, neodymium, terbium, thulium, nickel, titanium, iron and their mixtures.

6. A method of fabricating a solid state device comprising the steps of:

doping a solid state material having a surface with a dopant at a first valence state; and exposing said solid state material at elevated temperature, for a period of time, to an atmosphere designed to change the valence state of said dopant to a second valence state; said elevated temperature being below the melting point of said solid state material; said elevated temperature and period of time being calculated to change said valence state in direct proportion to distance from said surface.

7. The invention of claim 6 wherein said solid state material is selected from the group consisting of yttrium-aluminum-garnet, yttrium vanadate and yttrium orthosilicate.

8. The invention of claim 6 wherein said solid state material is selected from the group consisting of crystalline, polycrystalline, and glassy.

9. The invention of claim 6 wherein said atmosphere is oxidizing and said dopant is selected from the group consisting of samarium, europium, dysprosium, uranium, vanadium, chromium, cobalt, manganese, ytterbium, cerium, praseodymium, neodymium, terbium, thulium, nickel, titanium, iron, and their mixtures.

10. The invention of claim 6 wherein said atmosphere is oxidizing and said dopant at said first valence state is selected from the group consisting of $Sm^{2+}$, $Eu^{2+}$, $Dy^{2+}$, $U^{3+}$, $V^{2+}$, $V^{3+}$, $V^{4+}$, $Cr^{2+}$, $Cr^{3+}$, $Co^{2+}$, $Mn^{4+}$, $Mn^{5+}$, $Yb^{2+}$, $Ce^{3+}$, $Pr^{3+}$, $Nd^{2+}$, $Tb^{3+}$, $Tm^{2+}$, $Ni^{2+}$, $Ti^{2+}$, $Ti^{3+}$, and $Fe^{2+}$ and their mixtures.

11. The invention of claim 6 wherein said atmosphere is oxidizing and said dopant at said second valence state is selected from the group consisting of $Sm^{3+}$, $Eu^{3+}$, $Dy^{3+}$, $U^{4+}$, $V^{3+}$, $V^{4+}$, $V^{5+}$, $Cr^{3+}$, $Cr^{4+}$, $Co^{3+}$, $Mn^{5+}$, $Mn^{6+}$, $Yb^{3+}$, $Ce^{4+}$, $Pr^{4+}$, $Nd^{3+}$, $Tb^{4+}$, $Tm^{3+}$, $Ni^{3+}$, $Ti^{3+}$, $Ti^{4+}$, $Fe^{3+}$ and their mixtures.

12. The invention of claim 6 wherein said atmosphere is reducing and said dopant is selected from the group consisting of ytterbium, cerium, praseodymium, neodymium, terbium, dysprosium, thulium, samarium, europium, uranium, vanadium, chromium, cobalt, nickel, titanium, iron, manganese and their mixtures.

13. The invention of claim 6 wherein said atmosphere is reducing and said dopant at said first valence state is selected from the group consisting of $Yb^{3+}$, $Ce^{3+}$, $Ce^{4+}$, $Pr^{3+}$, $Nd^{3+}$, $Tb^{3+}$, $Tb^{4+}$, $Dy^{3+}$, $Tm^{3+}$, $Sm^{3+}$, $Eu^{3+}$, $U^{3+}$, $U^{4+}$, $V^{2+}$, $Cr^{3+}$, $Cr^{4+}$, $Co^{2+}$, $Co^{3+}$, $Ni^{2+}$, $Ti^{3+}$, $Ti^{4+}$, $Fe^{2+}$, $Fe^{3+}$, $Mn^{5+}$, $Mn^{6+}$, $Pr^{4+}$, $Ni^{3+}$, $V^{3+}$, $V^{4+}$, $V^{5+}$ and their mixtures.

14. The invention of claim 6 wherein said atmosphere is reducing and said dopant at said second valence state is selected from the group consisting of $Yb^{2+}$, $Ce^{3+}$, $Ce^{4+}$, $Pr^{3+}$, $Pr^{4+}$, $Nd^{2+}$, $Tb^{3+}$, $Tb^{4+}$, $Dy^{2+}$, $Tm^{2+}$, $Sm^{2+}$, $Eu^{2+}$, $U^{3+}$, $U^{4+}$, $V^{2+}$, $V^{3+}$, $V^{4+}$, $Cr^{3+}$, $Cr^{4+}$, $Cr^{2+}$, $Co^{2+}$, $Co^{3+}$, $Ni^{2+}$, $Ni^{3+}$, $Ti^{2+}$, $Ti^{3+}$, $Ti^{4+}$, $Fe^{2+}$, $Fe^{3+}$, $Mn^{4+}$, $Mn^{5+}$, $Mn^{6+}$ and their mixtures.

15. The invention of claim 9 wherein said oxidizing atmosphere is selected from the group consisting of air, molecular oxygen, and ozone.

16. The invention of claim 10 wherein said oxidizing atmosphere is selected from the group consisting of air, molecular oxygen, and ozone.

17. The invention of claim 11 wherein said oxidizing atmosphere is selected from the group consisting of air, molecular oxygen, and ozone.

18. The invention of claim 12 wherein said reducing atmosphere is selected from the group consisting of hydrogen gas and hydrogen/argon mixture.

19. The invention of claim 13 wherein said reducing atmosphere is selected from the group consisting of hydrogen gas and hydrogen/argon mixture.

20. The invention of claim 14 wherein said reducing atmosphere is selected from the group consisting of hydrogen gas and hydrogen/argon mixture.

21. A method of fabricating a solid state, laser light control device comprising the steps of:

doping a solid state material having a surface with a dopant at a first valence state;

exposing said solid state material at elevated temperature, for a period of time, to an atmosphere designed to change the valence state of said dopant to a second valence state; said elevated temperature being below the melting point of said solid state material; said elevated temperature and period of time being calculated to change said valence state in direct proportion to distance from said surface;

removing said atmosphere; and heating said solid state material at a temperature designed to cause diffusion of said dopant at said second valence state away from said surface for a time less than sufficient to cause the concentration of said dopant at said second valence state to be essentially uniform throughout said solid state material.

22. The invention of claim 21 wherein said solid state material is selected from the group consisting of yttrium-aluminum-garnet, yttrium vanadate and yttrium orthosilicate.

23. The invention of claim 21 wherein said solid state material is selected from the group consisting of crystalline, polycrystalline, and glassy.

24. The invention of claim 21 wherein said atmosphere is oxidizing and said dopant is selected from the group consisting of samarium, europium, dysprosium, uranium, vanadium, chromium, cobalt, manganese, ytterbium, cerium, praseodymium, neodymium, terbium, dysprosium, thulium, nickel, titanium, iron and their mixtures.

25. The invention of claim 21 wherein said atmosphere is oxidizing and said dopant at said first valence state is selected from the group consisting of $Sm^{2+}$, $Eu^{2+}$, $Dy^{2+}$, $U^{3+}$, $V^{2+}$, $V^{3+}$, $V^{4+}$, $Cr^{2+}$, $Cr^{3+}$, $Co^{2+}$, $Mn^{4+}$, $Mn^{5+}$, $Yb^{2+}$, $Ce^{3+}$, $Pr^{3+}$, $Nd^{2+}$, $Tb^{3+}$, $Tm^{2+}$, $Ni^{2+}$, $Ti^{2+}$, $Ti^{3+}$, and $Fe^{2+}$ and their mixtures.

26. The invention of claim 21 wherein said atmosphere is oxidizing and said dopant at said second valence state is selected from the group consisting of $Sm^{3+}$, $Eu^{3+}$, $Dy^{3+}$, $U^{4+}$, $V^{3+}$, $V^{4+}$, $V^{5+}$, $Cr^{3+}$, $Cr^{4+}$, $Co^{3+}$, $Mn^{5+}$, $Mn^{6+}$, $Yb^{3+}$, $Ce^{4+}$, $Pr^{4+}$, $Nd^{3+}$, $Tb^{4+}$, $Tm^{3+}$, $Ni^{3+}$, $Ti^{3+}$, $Ti^{4+}$, $Fe^{3+}$ and their mixtures.

27. The invention of claim 21 wherein said atmosphere is reducing and said dopant is selected from the group consisting of ytterbium, cerium, praseodymium, neodymium, terbium, dysprosium, thulium, samarium, europium, uranium, vanadium, chromium, cobalt, nickel, titanium, iron, manganese and their mixtures.

28. The invention of claim 21 wherein said atmosphere is reducing and said dopant at said first valence state is selected from the group consisting of $Yb^{3+}$, $Ce^{3+}$, $Ce^{4+}$, $Pr^{3+}$, $Nd^{3+}$, $Tb^{3+}$, $Tb^{4+}$, $Dy^{3+}$, $Tm^{3+}$, $Sm^{3+}$, $Eu^{3+}$, $U^{3+}$, $U^{4+}$, $V^{2+}$, $Cr^{3+}$, $Cr^{4+}$, $Co^{2+}$, $Co^{3+}$, $Ni^{2+}$, $Ti^{3+}$, $Ti^{4+}$, $Fe^{2+}$, $Fe^{3+}$, $Mn^{5+}$, $Mn^{6+}$, $Pr^{4+}$, $Ni^{3+}$, $V^{3+}$, $V^{4+}$, $V^{5+}$ and their mixtures.

29. The invention of claim 21 wherein said atmosphere is reducing and said dopant at said second valence state is selected from the group consisting of $Yb^{2+}$, $Ce^{3+}$, $Ce^{4+}$, $Pr^{3+}$, $Pr^{4+}$, $Nd^{2+}$, $Tb^{3+}$, $Tb^{4+}$, $Dy^{2+}$, $Tm^{2+}$, $Sm^{2+}$, $Eu^{2+}$, $U^{3+}$, $U^{4+}$, $V^{2+}$, $V^{3+}$, $V^{4+}$, $Cr^{3+}$, $Cr^{4+}$, $Cr^{2+}$, $Co^{2+}$, $Co^{3+}$, $Ni^{2+}$, $Ni^{3+}$, $Ti^{2+}$, $Ti^{3+}$, $Ti^{4+}$, $Fe^{2+}$, $Fe^{3+}$, $Mn^{4+}$, $Mn^{5+}$, $Mn^{6+}$ and their mixtures.

30. The invention of claim 24 wherein said oxidizing atmosphere is selected from the group consisting of air, molecular oxygen, and ozone.

31. The invention of claim 25 wherein said oxidizing atmosphere is selected from the group consisting of air, molecular oxygen, and ozone.

32. The invention of claim 26 wherein said oxidizing atmosphere is selected from the group consisting of air, molecular oxygen, and ozone.

33. The invention of claim 27 wherein said reducing atmosphere is selected from the group consisting of hydrogen gas and hydrogen/argon mixture.

34. The invention of claim 28 wherein said reducing atmosphere is selected from the group consisting of hydrogen gas and hydrogen/argon mixture.

35. The invention of claim 29 wherein said reducing atmosphere is selected from the group consisting of hydrogen gas and hydrogen/argon mixture.

36. A pump cavity, comprising:

a crystal having two opposing curved sides along a longitudinal axis, at least one of said curved sides having a narrow longitudinal slit-shaped area for admitting pump light into said cavity, and two opposing flat sides between said curved sides to facilitate heat removal from said cavity; and highly-reflective coatings on both of said curved sides except in said slit-shaped areas, the curvature of said curved sides directing said pump light entering said cavity via said slit-shaped areas through said core lasing region, and said reflective coatings repeatedly redirecting said pump light through said core, wherein said crystal contains a dopant species at a first valence state and said dopant species at a second valence state, and wherein the concentration of said dopant species at said first valance states increases with distance from said curved sides and the concentration of said dopant species at said second valence state decreases with distance from said curved sides.

37. The invention of claim 36 wherein the sum of said concentrations is a constant.

38. The invention of claim 36 wherein said solid state material is selected from the group consisting of yttrium-aluminum-gamet, yttrium vanadate and yttrium orthosilicate.

39. The invention of claim 36 wherein said solid state material is selected from the group consisting of crystalline, polycrystalline, and glassy.

40. The invention of claim 36 further comprising a laser diode positioned to direct narrow waveband pump light into said cavity through one of said narrow slit-shaped areas.

41. The invention of claim 36 further comprising a resonator with said pump cavity placed longitudinally within said resonator, whereby a laser is made.

42. The invention of claim 36 further comprising thermally conductive blocks affixed to said cavity for removing heat generated within said cavity.

* * * * *